(12) United States Patent
Barth

(10) Patent No.: US 6,334,216 B1
(45) Date of Patent: Dec. 25, 2001

(54) ACCESS CONTROL FACILITY FOR A SERVICE-ON-DEMAND SYSTEM

(75) Inventor: Ulrich Barth, Munchingen (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/203,357

(22) Filed: Dec. 2, 1998

(30) Foreign Application Priority Data

Dec. 5, 1997 (DE) .............................................. 197 53 933

(51) Int. Cl.⁷ ...................................................... H04N 7/16
(52) U.S. Cl. ................................................. 725/30; 725/25
(58) Field of Search ..................................... 709/217, 219; 348/6, 7, 12, 10; 380/10, 20; 725/25, 30, 104

(56) References Cited

U.S. PATENT DOCUMENTS

| | | |
|---|---|---|
| 5,173,589 | 12/1992 | Diehl . |
| 5,613,012 * | 3/1997 | Hoffman et al. ................... 382/115 |
| 5,768,419 * | 6/1998 | Gundlach et al. ............. 395/187.01 |
| 5,878,141 * | 3/1999 | Daly et al. ......................... 380/25 |
| 5,973,756 * | 10/1999 | Erlin ................................. 348/734 |
| 6,035,329 * | 3/2000 | Mages et al. ...................... 709/217 |
| 6,038,551 * | 3/2000 | Barlow et al. ...................... 705/41 |
| 6,040,829 * | 3/2000 | Croy et al. ........................ 345/327 |
| 6,055,314 * | 4/2000 | Spies et al. ......................... 380/21 |

FOREIGN PATENT DOCUMENTS

| | | |
|---|---|---|
| 3512785 | 10/1986 | (DE) . |
| 3804618 | 8/1989 | (DE) . |
| 3915096 | 11/1990 | (DE) . |
| 3706465 | 9/1993 | (DE) . |
| 9411171 | 11/1994 | (DE) . |
| 19520180 | 5/1996 | (DE) . |
| 4405570 | 7/1996 | (DE) . |
| 0671830 | 9/1995 | (EP) . |
| 0750423 | 12/1996 | (EP) . |
| 19527715 | 2/1997 | (EP) . |
| 2311451 | 9/1997 | (GB) . |
| WO9520294 | 7/1995 | (WO) . |
| WO9729592 | 8/1997 | (WO) . |
| WO9735430 | 9/1997 | (WO) . |

OTHER PUBLICATIONS

Königs, In: *IEEE Communications Magazine*, 6:42–48 (1991).
Schooneveld, *J. Res.*, 50:217–225 (1996).
"Gluckliches Ende in Decoder–Streit", FUNKSCHAU, No. 3, 1996, pp. 39–41.
T. R. Hurley, "Evolution of the Digital Set Top Box", Conference Publication No. 428 of the International Broadcasting Convention, Sep. 12–16, 1996, pp. 277 to 282.
C.C. Chang et al, "Using Smart cards to Authenticate Remote Passwords", Computers Math Applic., vol. 26, No. 7, pp. 19–27, 1993.

* cited by examiner

Primary Examiner—Victor R. Kostak
(74) Attorney, Agent, or Firm—Sughrue Mion, PLLC

(57) ABSTRACT

A service-on-demand system (1) with a set-top box (2) which is connected to the service-on-demand system (1) and includes a smart-card interface (3) and a decoder (5) which can read and decode information stored on a smart card (4) inserted by a user into the interface (3), and with a controller which can permit or block access to the service-on-demand system (1) depending on the decoded information is characterized in that input means (6) are provided for enabling the user to enter a secret number, and that the decoder (5) of the set-top box (2) is granted access to the inserted smart card (4) for reading and decoding the information stored thereon only if a correct secret number was entered. Unauthorized access to the system can thus be prevented with a higher degree of certainty than in conventional systems. The sensitive data stored on the smart card are additionally protected against unauthorized readout by a password.

13 Claims, 1 Drawing Sheet

ACCESS CONTROL FACILITY FOR A SERVICE-ON-DEMAND SYSTEM

BACKGROUND OF THE INVENTION

This invention relates to an access control facility for a service-on-demand system, comprising a set-top box which is connected to the service-on-demand system and includes a smart-card interface and a decoder which can read and decode information stored on a smart card inserted by a user into the interface, said access control facility further comprising a controller which can permit or block access to the service-on-demand system depending on the decoded information.

A service-on-demand system with such an access-control facility is described, for example, in the German journal "Funkschau", No. 3, 1996, pages 39 to 41.

Service-on-demand systems, particularly video-on-demand and pay TV, but also electronic banking and other electronically switchable value-added services, are enjoying increasing popularity.

Unlike phone cards, on which a fixed credit is stored when they are purchased, which can be gradually exhausted, so that when there is no credit left on the card, the latter will be worthless, the smart cards used in service-on-demand systems are, as a rule, replenishable against a corresponding payment or by debiting a deposit account. Frequently, however, no credit is stored on the credit card itself, but after access to the system, billing takes place via a customer-related electronic deposit account. In service-on-demand systems, therefore, it is particularly important to check the user's access authorization, which is unnecessary with phone cards.

To this end, a service-on-demand system usually comprises a plurality of set-top boxes with a smart-card interface and a decoder which reads and decodes the information stored on a smart card inserted by a user. In a controller, access to the point-to-multipoint system is then permitted or blocked depending on the decoded information. The operation of such a set-top box is described, for example, in an article entitled "Evolution of the Digital Set-Top Box", Conference Publication No. 428 of the International Broadcasting Convention, Sep. 12–16 1996, pages 277 to 282.

In differently constructed electronic environments, such as multiuser networks, unauthorized access is prevented by even further-reaching security measures. In an article by Chang and Hwang published in Computers Math. Applic., Vol. 26, No. 7, 1993, pages 19 to 27, the use of a password in addition to the use of a smart card as a prerequisite for gaining access to a computer system is described. A considerable problem arises from the transport of the password, which is entered by the user at a peripheral device, through the network to a central processing unit where authentication is performed by comparing this password with a stored list of valid passwords. On its way through the network, the password may be intercepted and deciphered, so that unauthorized persons may easily gain access to the network. Another problem is that the information stored on the smart card can be read without any evidence of the user's authority to access this information being required.

SUMMARY OF THE INVENTION

It is an object of the present invention to provide an access control facility for a service-on-demand system of the kind described at the beginning which can prevent unauthorized access to the system with a higher degree of certainty than conventional facilities, with the generally sensitive and user-related data on the smart card being better protected against unauthorized readout.

The invention is characterized in that input means are provided for enabling the user to enter a secret number, and that the decoder of the set-top box is granted access to the inserted smart card for reading and decoding the information stored thereon only if a correct secret number was entered.

Through the use of a secret number in addition to the hitherto required insertion of a smart card into the set-top box, a substantially higher barrier is created against intrusion into the service-on-demand system. Protection for the data stored on the smart card is increased as these data can be read by the set-top box only if a correct secret number was entered.

The input means of the access control facility according to the invention preferably comprise a keyboard and/or voice-controlled remote-control elements, with mouse systems or similar continuous input means being usable instead of or in addition to the keyboard.

A particularly preferred embodiment of the access control facility according to the invention is characterized in that the secret number specific to the respective authorized user is stored on the smart card, and that access to the service-on-demand system is permitted only if the secret number entered by the user corresponds with the secret number stored on the smart card. The secret number can thus be checked already in the area of the set-top box, i.e., without having to be transported over long data paths with the above-described insecurities.

In a preferred development of this embodiment, the decoder can access the other data stored on the smart card only if the secret number entered by the user corresponds with the secret number stored on the smart card. In this manner, the smart card itself is protected by the secret number, while in conventional solutions, only the entry of the secret number together with the insertion of the smart card into the set-top box provides additional protection against unauthorized use of the system.

To further increase the protection of the data stored on the smart card and particularly of the secret number, the secret number stored on the smart card is not readable, and the smart card contains an arithmetic unit or an electronic circuit which can compare the secret number entered by the user with the stored secret number. Thus, if an unauthorized person should obtain possession of the smart card, the card will be of no use to that person as long as he or she does not know the secret number.

In another preferred embodiment of the access control facility according to the invention, the data stored on the smart card are at least partially exchangeable or renewable. Compared with systems in which the data stored on the smart card cannot be changed later, substantially increased flexibility is provided for the user, the system operator, and the providers connected to the system.

Thus, besides the user-specific secret number, data that can be entered by the user himself or herself, such as configuration data for personalized user interfaces (look-and-feel), setup information, branch addresses (bookmarks), etc., may be stored on the smart card.

Alternatively or in addition, user-related data that can be entered by the service provider connected to the service-on-demand system, such as credit frames, personal discounts, etc., and/or information intended for major user groups, such as current special offers, announcements, scheduled times, etc., may be stored on the smart card.

The invention also provides a method of operating the above-described access control facility which is characterized in that the decoder of the set-top box reads a customer number stored on the smart card and passes it on to a server or central station connected to the service-on-demand system, that in the server or central station, the customer number is compared with data-base entries present therein, and that if the customer number corresponds with a customer number registered there, the user will be granted access to the service-on-demand system via the set-top box. With the aid of the customer number, an electronic account can be kept via which charges can be made to the customer for the use of services.

Preferably, the customer number is transmitted from the set-top box over the return channel of the service-on-demand system to the server or central station in encrypted form, particularly in RSA-encrypted form, so as to prevent unauthorized access to the customer number or at least make such access more difficult.

Another advantageous variant of the method is characterized in that together with the customer number, a time stamp is transferred from the set-top box to the server or central station, that the received time stamp is compared with the current time, and that the access-granting procedure can continue only if the comparison indicates equality between the two times within a preselected time window. In this manner, reproduction by unauthorized persons having gained possession of the smart card is made virtually impossible.

In a further advantageous variant of the method, together with the customer number, a device number stored in the set-top box is transmitted to the server or central station. The device number enables the system operator to prevent non-authorized set-top boxes (for example set-top boxes reported stolen) from gaining access to the system.

It is also advantageous for the system management if access to the service-on-demand system can be prevented despite the use of the smart card and the entry of the correct secret number, for example if a loss of the smart card has been notified by the authorized user or in case of nonfulfillment of obligations by the user.

Further advantages of the invention will become apparent from the following description and the accompanying drawing. According to the invention, the aforementioned features and the features described in the following can be used alone or in arbitrary combinations. While particular embodiments of the invention are shown and described, it is to be understood that the description is made only by way of example and not as a limitation to the scope of the invention.

BRIEF DESCRIPTION OF THE DRAWINGS

The invention is illustrated in the accompanying drawing and will now be explained with reference to embodiments of the invention.

The single FIGURE of the drawing is a schematic representation of the access control facility in accordance with the invention.

DETAILED DESCRIPTION OF THE INVENTION

Figure 1:
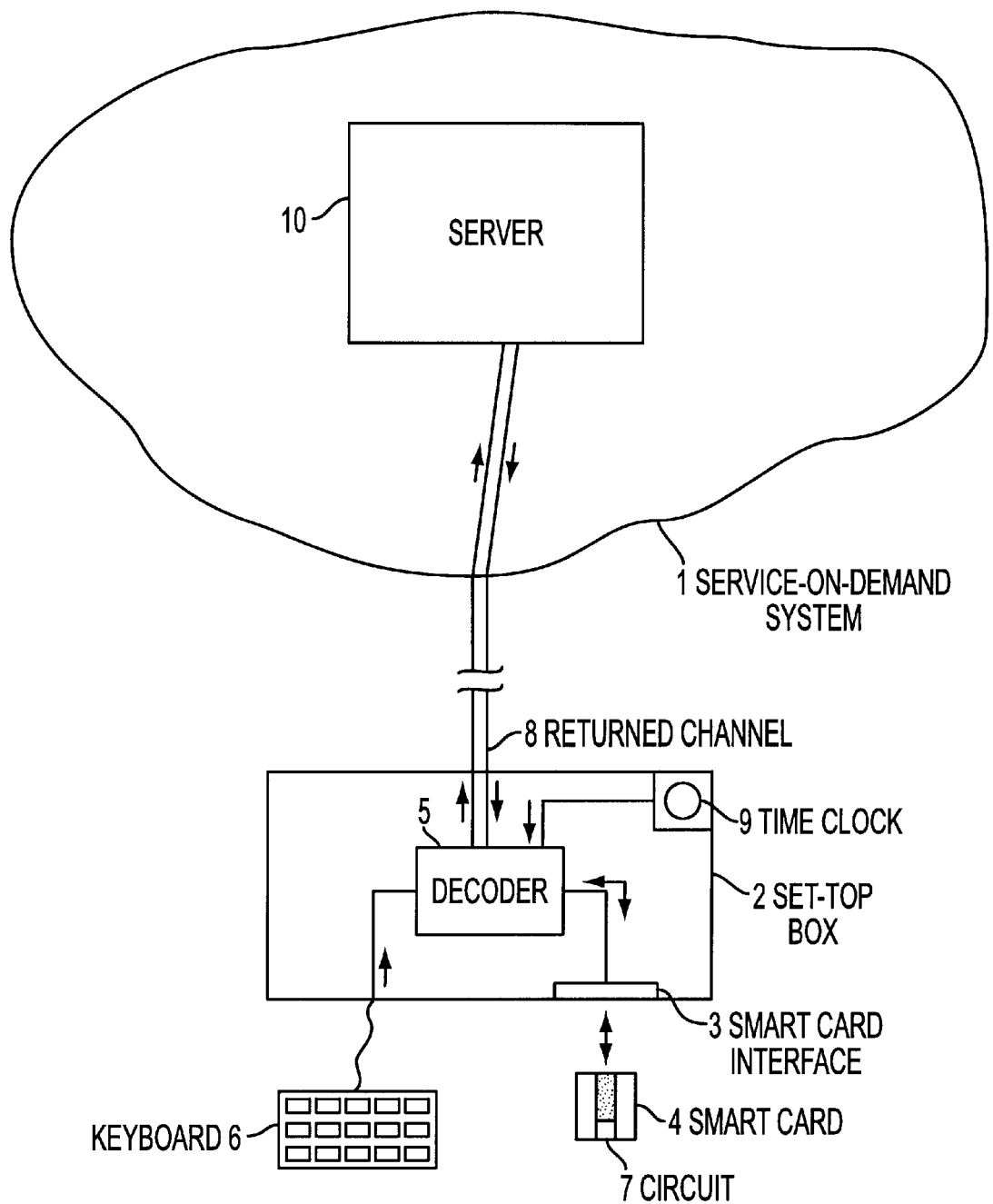

The access control facility comprises a set-top box 2 connected to a service-on-demand system 1 and having an interface 3 for insertion of a smart card 4 and a decoder 5 for reading and decoding information stored on the smart card 4. Connected to the set-top box 2 is a keyboard 6 which serves as an input means via which a user (not shown) can enter a secret number into the set-top box 2. This user-specific secret number is also stored in nonreadable form on the smart card 4. In addition, however, the smart card 4 contains partially exchangeable or renewable data, namely data that can be entered by the user himself/herself (for example configuration data, setup information, branch addresses, etc.), and user-related data that can be entered by a service provider connected to the service-on-demand system 1 or by the system operator (for example credit frames, specific customer discounts), and/or information intended for major user groups (current special offers, announcements, scheduled times, etc.).

The decoder 5 will be given access to the readable data of the smart card 4 only if after entry of the secret number through the keyboard 6, correspondence between this secret number and the secret number stored on the smart card 4 in nonreadable form was determined. The comparison between the secret number entered by the user and the stored secret number is performed by an electronic circuit 7 provided on the smart card 4 or by a corresponding arithmetic unit on the smart card 4.

If the result of the comparison is positive, the decoder 5 will read a customer number stored on the smart card 4, provide this customer number with a current time stamp from a time clock 9, and transmit the data in encrypted form, together with the device number of the set-top box 2, over a return channel 8 to the service-on-demand system 1, where the information is passed on to a server or central station 10. There, the time stamp will be compared with the current time, and if correspondence is determined between the two times, the access authorization procedure will be executed within a preselected time window.

To this end, the customer number is compared with data-base entries existing in the central station 10, and if it matches a customer number registered there, and there is no blocking note, the customer will be permitted access to the service-on-demand system 1 via the set-top box 2. A blocking note may be provided, for example, if the authorized user has notified the loss of his smart card 4 or, for example, has defaulted on his payments to a service provider in the service-on-demand system 1. Access to the system can also be blocked if the device number transmitted to the central station 10 indicates that the set-top box 2 is not authorized to access the system, for example because the set-top box has been reported stolen.

Advantageously, any authorized user can obtain access to the service-on-demand system from any set-top box 2 by means of his smart card 4 and the secret number known exclusively to him if the other requirements are met (no blocking notes). If the authorized customer should lose the smart card 4, an unauthorized person who does not know the secret number can neither intrude into the system nor read data from the smart card 4. Further security is provided by the time comparison following the time stamping in the set-top box 2, for example if the smart card 4 or the data thereon has been counterfeit.

What is claimed is:

1. An access control facility for a service-on-demand system comprising:

a set-top box which is connected to the service-on-demand system and includes a smart-card interface and a decoder which can read and decode information stored on a smart card inserted by a user into the interface;

a controller which can permit or block access to the service-on-demand system depending on the decoded information;

input means operable to enable the user to enter a secret number;

wherein the decoder of the set-top box is granted access to the inserted smart card for reading and decoding the information stored on the smart card only if a correct secret number was entered;

wherein the secret number specific to the respective authorized user is stored on the smart card, and that access to the service-on-demand system is permitted only if the secret number entered by the user corresponds with the secret number stored on the smart card; and wherein the secret number stored on the smart card is not electronically readable from the smart card, and wherein the smart card contains at least one of an arithmetic unit and an electronic circuit, both of which can compare the entered secret number with the stored secret number.

2. An access control facility as claimed in claim 1, wherein the input means comprises at least one of a keyboard and a voice-controlled remote-control.

3. An access control facility as claimed in claim 1, wherein the decoder can access the other data stored on the smart card only if the secret number entered by the user corresponds with the secret number stored on the smart card.

4. An access control facility as claimed in claim 1, wherein data stored on the smart card are at least partially exchangeable or replaceable.

5. An access control facility as claimed in claim 4; wherein besides the user-specific secret number, customized data capable of being entered by the user himself or herself are stored on the smart card, wherein the customized data comprises at least one of configuration data for personalized user interfaces (look-and-feel), setup information, and branch addresses (bookmarks).

6. An access control facility as claimed in claim 4, wherein besides the user-specific secret number, user-related data capable of being entered by a service provider connected to the service-on-demand system are stored on the smart card, wherein the user-related data comprises at least one of credit frames, personal discounts, and information intended for major user groups.

7. A method of operating an access control facility as in claim 1, wherein the decoder of the set-top box reads a customer number stored on the smart card and passes it on to a server or central station connected to the service-on-demand system, wherein the server or central station compares the customer number with database entries present therein, and if the customer number matches a customer number registered there, the user will be granted access to the service-on-demand system via the set-top box.

8. A method as claimed in claim 7, wherein the customer number is transferred from the set-top box to the server or central station over the return channel of the service-on-demand system in encrypted form, particularly in RSA-encrypted form.

9. An method as claimed in claim 7, wherein together with the customer number, a time stamp is transferred from the set-top box to the server or central station, wherein the received time stamp is compared with the current time, and the access-granting procedure can continue within a preselected time window only if the comparison indicated equality between the time-stamp and the current time.

10. A method as claimed in claim 7, wherein together with the customer number, a device number stored in the set-top box is transferred to the server or central station.

11. A method as claimed in claim 7, wherein access to the service-on-demand system can be blocked despite the use of the smart card and the entry of the correct secret number.

12. An access control facility as claimed in claim 6, wherein the information intended for major user groups comprises at least one of current special offers, announcements, and scheduled times.

13. A method as claimed in claim 11, wherein access to the service-on-demand system can be blocked if the authorized user has notified a loss of the smart card or in case of nonfulfillment of obligations by the user.

* * * * *